(12) United States Patent
Zemer et al.

(10) Patent No.: US 12,194,462 B2
(45) Date of Patent: Jan. 14, 2025

(54) SYSTEM FOR IMAGING AND MONITORING FLUIDS

(71) Applicant: VBact Ltd., Rehovot (IL)

(72) Inventors: Dan Zemer, Rehovot (IL); Oz Bornstein, Ramat Hasharon (IL)

(73) Assignee: VBact Ltd., Rehovot (IL)

( * ) Notice: Subject to any disclaimer, the term of this patent is extended or adjusted under 35 U.S.C. 154(b) by 829 days.

(21) Appl. No.: 17/299,046

(22) PCT Filed: Dec. 9, 2019

(86) PCT No.: PCT/IL2019/051344
§ 371 (c)(1),
(2) Date: Jun. 2, 2021

(87) PCT Pub. No.: WO2020/121298
PCT Pub. Date: Jun. 18, 2020

(65) Prior Publication Data
US 2022/0032299 A1 Feb. 3, 2022

(30) Foreign Application Priority Data

Dec. 9, 2018 (IL) .......................................... 263582

(51) Int. Cl.
*B01L 3/00* (2006.01)
*G06T 7/00* (2017.01)

(52) U.S. Cl.
CPC ... *B01L 3/502715* (2013.01); *B01L 3/502753* (2013.01); *G06T 7/0012* (2013.01); *B01L 2300/0681* (2013.01); *B01L 2300/0809* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS

| 6,573,108 | B1 | 6/2003 | Hardman et al. |
| 9,808,803 | B2 * | 11/2017 | Toner ..................... B01D 45/04 |
| 2005/0087122 | A1 * | 4/2005 | Ismagliov ........... B01F 25/4331 |
| | | | 117/200 |
| 2006/0234241 | A1 | 10/2006 | Ohnishi et al. |

(Continued)

FOREIGN PATENT DOCUMENTS

KR 101702745 2/2017

OTHER PUBLICATIONS

PCT Search Report and Written Opinion PCT/IL2019/051344, Mar. 12, 2020.
European Extended Search Report 19895138, Nov. 30, 2021.

*Primary Examiner* — Lore R Jarrett
(74) *Attorney, Agent, or Firm* — Dekel Patent Ltd.; David Klein

(57) ABSTRACT

The present disclosure concerns a system for imaging and monitoring fluids to identify the presence of objects therein. Objects that are being identified by the system include, for example, microorganisms, particles, bacteria, cells, foreign substances (e.g. bubbles of air in a liquid, substance that may change visual parameters of the main liquid such as color and transparency), etc. Identification of the objects by the system is then may be followed by analysis to conclude the status of the system (e.g. identifying contamination, impurities, etc.).

20 Claims, 6 Drawing Sheets

(56) References Cited

U.S. PATENT DOCUMENTS

| | | |
|---|---|---|
| 2011/0064613 A1 | 3/2011 | Chen |
| 2017/0241892 A1* | 8/2017 | Brubacher ............ G06T 7/0012 |
| 2017/0299492 A1* | 10/2017 | Rindorf ............. G01N 15/1484 |
| 2018/0080870 A1 | 3/2018 | Yamamoto |
| 2018/0340882 A1 | 11/2018 | Foster |

* cited by examiner

SYSTEM FOR IMAGING AND MONITORING FLUIDS

TECHNOLOGICAL FIELD

The present disclosure is in the field of imaging and monitoring fluids, specifically liquids, for identifying the presence of micro objects or particles.

BACKGROUND ART

References considered to be relevant as background to the presently disclosed subject matter are listed below:
WO 2011/151820

BACKGROUND

Liquids play a major role in many daily life and industrial systems and applications. The purification degree of the liquid may be of major importance for the proper function in many of such systems. For example, this is relevant to systems relating to drinking water, systems that include cooling liquid or systems that make use of fuels.

Real-time monitoring of contamination or impurities in liquids that are crucial for the functionality of systems, may give an advantage by early detection of a malfunction or irregularity of the systems and the origin of the cause thereof. Therefore, a relatively immediate fixing of the malfunction or irregularity is enabled. In other applications, such monitoring enables quality assurance validating that objects of interest that are required to be in the liquids, do present in it. Additional applications for this type of monitoring are optimization of filtration systems and control of various processes involving liquids, like water treatment.

General Description

The present disclosure concerns a system for imaging and monitoring fluids to identify the presence of objects therein. Objects that are being identified by the system include, for example, microorganisms, particles, bacteria, cells, foreign substances (e.g. bubbles of air in a liquid, substance that may change visual parameters of the main liquid such as color and transparency), etc. Identification of the objects by the system is then may be followed by analysis to conclude the status of the system (e.g. identifying contamination, impurities, etc.)

In one aspect of the present disclosure, provided a device for directing fluid, such as gas and specifically flowing liquid, to be imaged to an imaging portion such that the fluid in the imaging portion is characterized substantially by a laminar flow.

The device comprising a flow channel extending between a first and second portion defining a flow path therebetween, the second portion being downstream to the first portion. An imaging portion is defined along the flow path, between the first and the second portion. The imaging portion has an imaging segment with at least one planar imaging portion defined between a lead sloping segment and a drain sloping segment, the lead and the drain sloping segments are defined along the flow path. The lead sloping segment links the planar imaging portion to the first portion of the flow channel, and the drain sloping segment links the planar imaging portion to the second portion of the flow channel. Therefore, fluid enters the flow channel, flows from the first portion and reaching the second portion by passing through the lead sloping segment, the planar imaging portion, and the drain sloping segment.

The thickness of the flow channel varies along the sloping segments, the thickness decreases along the downstream direction of the flow path at the lead sloping segment and increases along the downstream direction of the flow path at the drain sloping segment. In some embodiments, a portion of the imaging portion is characterized by being the narrowest/thinnest portion along the flow path in the channel.

The imaging segment comprises at least one transparent wall to permit imaging of fluid flowing therethrough. For example, in the instance that an imaging unit and light source are disposed at one side of the channel, a single wall of the channel may be transparent. In this configuration, the light from the light source passes through the transparent wall and is reflected from objects in the fluid at the imaging segment towards the imaging unit through the transparent wall. In some embodiments, the imaging segment has at least two transparent walls, such that an imaging unit has a clear optical path to the fluid through one wall and a lighting unit has a clear optical path to the fluid from the other transparent wall.

In some embodiments of the device, the imaging segment is of a uniform thickness. The thickness is defined between the planar imaging portion and one of the channel's walls, which is, in this specific embodiment, parallel to the planar imaging portion.

The plane spanned by the planar imaging portion may be parallel to at least one of wall of the first and the second portions. In some other embodiments, the plane spanned by the planar imaging portion is inclined with respect to at least one wall of the first and the second portions.

In some other embodiments of the device, the imaging segment is of a varied thickness. In other words, different portions of the imaging segment have a different thickness.

Fluid flows through the device may comprise particulate matter such as microorganisms, sub-micron and/or micron-sized particles. These particulate matter flows along the imaging segment so it can be imaged and identified by an imaging system associated with the device.

The lead and the drain sloping segments comprise slopes defined by an angle with respect to the planar imaging portion. In some embodiments, one or both of the slopes is defined by a linear sloped surface at a gradually-increasing angle with respect to the planar imaging portion, while in some other embodiments one or both of the sloping segments can have a varying slope angle along the flow path.

In some embodiments, one or both of the sloping segments have two or more sections of different slope angles, namely different increase or decrease thickness rate. For example, the first section may have a slope angle in the range of between 3°, 4°, 5°, 6° to 8°, 9°, 10°, 11°, typically 6°-8°, e.g. about 7° with respect to the planar imaging portion. The second section, proximal to said imaging segment, may have a slope angle in the range of between 20°, 21°, 22°, 23°, 24° to 26°, 27°, 28°, 29°, 30°, typically 23°-27°, 24°-26°, e.g. about 25°.

In some embodiments, the slope angle of the lead sloping segment gradually decreases, namely the decreased thickness rate getting smaller along the flow path towards the imaging portion. In other words, the angle of the slope of the leading slope segment with respect to the planar imaging portion is at its maximum in the proximity to the first portion and gradually decreasing until reaching its minimum in the proximity to the planar imaging portion. This may permit a steady, laminar and non-turbulent flow of the fluid along the imaging portion to allow repetitive conditions for imaging the fluid.

In some embodiments, the device comprising a filtration unit disposed in the flow path upstream said first portion. The filtration unit is configured to filter-out particles of size larger than a predetermined dimension, these may be, for example, particles other than microorganism, and/or particles of a size larger than a predetermined size, e.g. a micron. In some embodiments the filtration unit filters-out particles larger than the minimum thickness of the imaging portion.

In some embodiments of the device, the imaging portion has a thickness of between 1 and 100 μm.

In some embodiments, the device further comprising a bypass channel linking the first and second portions such that a portion of the fluid flowing in the flow path flows through the imaging portion while the rest flows through the bypass channel.

The first portion, the imaging portion and the second portion may extend along a common longitudinal axis such that fluid flows therethrough, flows in a generally straight direction, and the bypass channel diverges sideways away from said first portion and converges back to said second portion to thereby bypassing the imaging portion.

The first portion, the imaging portion, the second portion and the bypass channel, defining together a flow channel, and may be integrally formed in a solid slide. The slide may be entirely or partially made of transparent or optically clear materials, such as glass or polymers. The device may be configured with inlet and outlet port elements at the ends of the first and second portions, respectively, for allowing fluid to ingress the flow channel and egress therefrom. Such a slide may comprise a plurality of flow channels as described above. The flow channels in the slide may be similar or different. For example, some of the flow channels may have a bypass channel while some may not have.

Another aspect of the present disclosure provides a system for monitoring and imaging particulate matter in a liquid. The system comprising a flow channel permitting flow of liquid along a flow path having a first portion, an imaging portion downstream thereto and a second portion downstream said imaging portion. The imaging portion comprises imaging segment with at least one planar imaging portion defined between a lead sloping segment linked to said first portion with a thickness that decreases along the flow path towards the imaging segment and a drain sloping segment linked to said second portion with a thickness that increases from said imaging segment along the flow path. The system further comprising an imaging unit for optically monitoring the liquid in said imaging segment.

In some embodiments of the system, the imaging unit comprises a light source and an optical sensor, such as camera. The optical sensor and the light source can be positioned at a common side of the imaging system or can be positioned one at one side of the imaging segment and the other at the other side thereof.

The system may employ the above-described device in any of the embodiments thereof as described above.

In some embodiments, the system includes a plurality of flow channels according to the present disclosure, and is configured to alternately image each flow channel over time at a predetermined sequence. In some other embodiments, the system comprising a multi-camera system that is configured to image each of the flow channels simultaneously.

Another aspect of the present disclosure provides a filtration unit for filtering particles from a liquid. The filtration unit comprising an inlet chamber and an outlet chamber separated from one another by a filter member. The filter member has a filter configured to block passage of particles of size above a predetermined size corresponding to its porosity. The filtration unit has a source liquid inlet and a discharge outlet linked to the inlet chamber. Thus, new liquid to be filtered ingresses to the inlet chamber through the source liquid inlet, and the portion of the liquid that is filtered out and does not pass through the filter of the filter member egresses the inlet chamber through the discharge outlet. The filtered liquid outlet is linked to the outlet chamber to permit filtered liquid to egress the outlet chamber and continue to flow. The inlet chamber is configured to permit turbulent water flow between the inlet and the discharge outlet, to permit removal of particulate matter from the filter's surface, and their discharge out through the discharge outlet. The liquid flow resistance of the filter and of the discharge outlet is being matched such that the liquid entering the inlet chamber flows partially out of the discharge outlet and partially through the filter into the outlet chamber. In other words, the structure of the inlet chamber, including the filter member's surface facing the chamber and the discharge outlet, is configured to allow the flow of liquid ingressing the inlet chamber to be diverted to the filter such that the flow thereof is characterized by a turbulent flow. A portion of the liquid passes through the filter to the outlet chamber while the other portion that is filtered out, including filtered particulate matter, remains in the inlet chamber and discharged through the discharge outlet. In this manner, particulate matter that is filtered out by the filter and may adhere thereto, are washed by the constant turbulent flow of new liquid ingressing the inlet chamber.

In some embodiments of the filtration unit, a first wall of the inlet chamber is configured deflect liquid that ingresses through the source liquid inlet toward the filter member. The source liquid inlet may direct or jet the liquid that ingresses therethrough toward the first wall to causes or enhance the turbulent flow.

The filter member may be generally planar and the first wall is angled with respect to the plane defined by the planar filter member. In some embodiments, the angle between the first wall and the filter's plane is an acute angle and liquid directed to the first wall may be deflected by the wall toward the filter.

The first wall may extend at an angle from an end of the filter member, namely the filter member and the first wall have a common corner.

The inlet chamber may have a generally triangular cross-section defined between the filter member, the first wall and a base wall. The source liquid inlet and the discharge outlet are formed within the base wall.

The filter is configured to block the passage of particulate matter, typically particles above 3-100 μm, depending on the specific application.

The filter member may comprise a membrane and in some embodiments may have a generally circular shape.

The filter unit may be comprised within the system for monitoring and imaging particulate matter in a liquid as described above with respect to an aspect of the present disclosure. The filtration unit is disposed in the flow path upstream to the first portion to provide filtered liquid to the flow channel(s) of the system.

The system may have a pressure regulator upstream to the filtration unit to regulate the liquid pressure at the source liquid inlet.

The filtration unit and the device, both aspects of the present disclosure, may be assembled to an assembly that provides a functional component in a system for monitoring and imaging of a flowing liquid for identifying contaminators and/or quantifying objects/particles.

Yet another aspect of the present disclosure provides an imaging system comprising a light unit configured to illuminate an imaging portion. The imaging portion can include any object, entity or substance that is to be imaged. For example, the imaging portion can include fluid flowing therethrough (e.g. liquid) to be imaged by the imaging system. The light unit includes a light-emitting diode (LED) that has a defined DC current rating. In other words, the LED is characterized to work at a typical current value. The system further includes an image sensor, such as a camera configured to detect/image illumination response from the imaging portion to obtain imaging data. The illumination response may be either reflection of light received from the imaging portion or transmission of light through the imaging portion. A control unit is in communication with the light unit and the image sensor and configured to activate the LED to emit light at an illumination time period in which the image sensor is activated. The control unit activates the LED by a current which at least a few folds higher than the current rating. The current can be 2, 3, 4, 5, 6, 7, 8, 9, 10, 11, 12, 13, 14, 15, 16, 17, 18, 19, or sometimes about 20-folds the current rating. The illumination time periods are relatively short so the LED is capable to withstand the relatively high intensity current bursts applied therethrough during these illumination time periods. The illumination time periods are less than 100, 90, 80, 70, 60, 50, 40, 30, 20, 10, 5, 4, 3, 2, 1, 0.9, 0.8, 0.7, 0.6, 0.5, 0.4, 0.3, 0.2 or at time less than 0.1 μsec (microseconds). In a specific embodiment, the illumination time periods are in the range of about 1-20 μsec. In yet another specific embodiment, the illumination time periods are in the range of about 8-12 μsec.

In some embodiments, the illumination time periods are in the range of about 0.1 to 20 μsec.

In some embodiments of the imaging system, the LED is activated by a current in the range of about 3-20, 4-18, 5-15 or at times 8-12 Ampere. Therefore, in a relatively short period, the LED is activated by a burst of a relatively high current to produce a short and bright illumination.

In some embodiments of the imaging system it comprises a flow channel permitting flow of fluid along a flow path that comprises the imaging portion. In yet, some other embodiments, the flow channel comprises at least one transparent wall to permit the illumination and imaging of the imaging portion by the imaging system.

The term "about" throughout the specification should be interpreted as an inaccuracy of up to 20% from the nominal value it refers to. For example, the term about 10 μsec should be interpreted as 8-12 μsec.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2A shows a top view of the slide; FIG. 2B shows a perspective view of a top portion of the slide; and FIG. 2C shows a perspective view of a bottom portion of the slide.

FIG. 3A shows a longitudinal cross-section of the filtration unit; and FIG. 3B shows a side view of the filtration unit.

DETAILED DESCRIPTION OF EMBODIMENTS

Figure 1A:
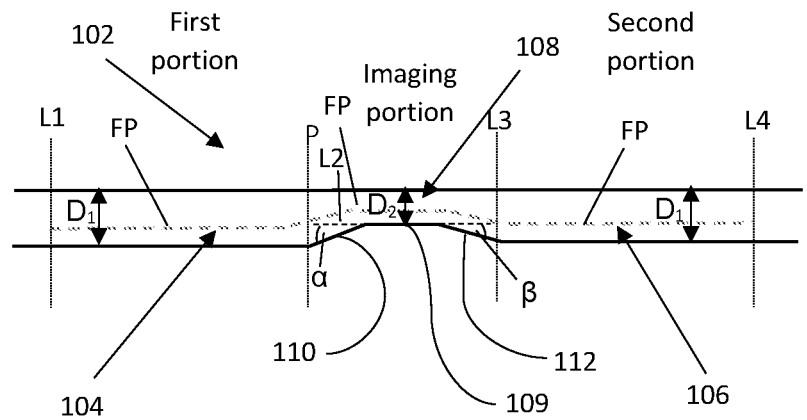
FIGS. 1A-1D are schematic illustrations of cross-sectional views of examples of the flow channel according to embodiments of the present disclosure.

FIG. 1A is a schematic cross-sectional view of an example of the flow channel according to one embodiment thereof. The flow channel 102 has a first portion 104, defined between lines L1 and L2, and a second portion 106, defined between lines L3 and L4. The second portion 106 is disposed downstream to the first portion 104. An imaging portion 108 is disposed between the first portion 104 and the second portion 106, namely between lines L2 and L3, such that a flow path FP is defined by the first portion 104, the imaging portion 108 and the second portion 106.

The imaging portion 108 has a planar imaging portion 109 on which the imaging of the liquid is carried out by an imaging unit (not shown) disposed external to the channel 102. The imaging portion 108 is linked to the first portion 104 by a lead sloping segment 110 at one side, and to the second portion 106 by a drain sloping segment 112 at its other side. In this example, the lead sloping segment 110 has a constant slope angle α with respect to the plane P defined by the planar imaging portion 109. The drain sloping segment 106 has a constant slope angle β which can be similar to or different than that of the slope angle of the lead sloping segment 110.

Figure 1B:
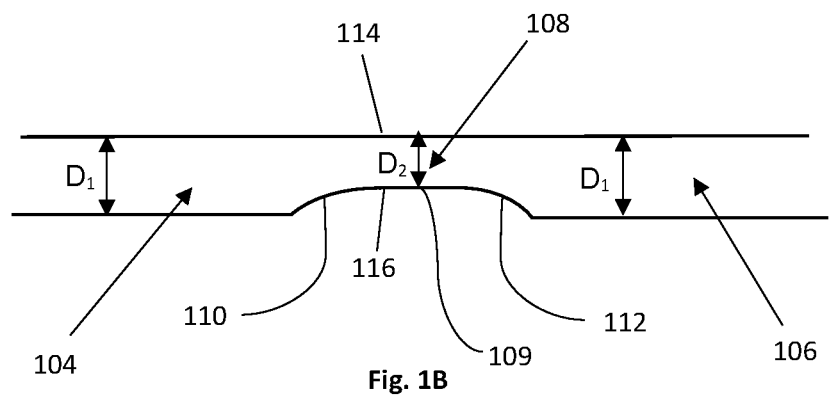
Figure 1C:
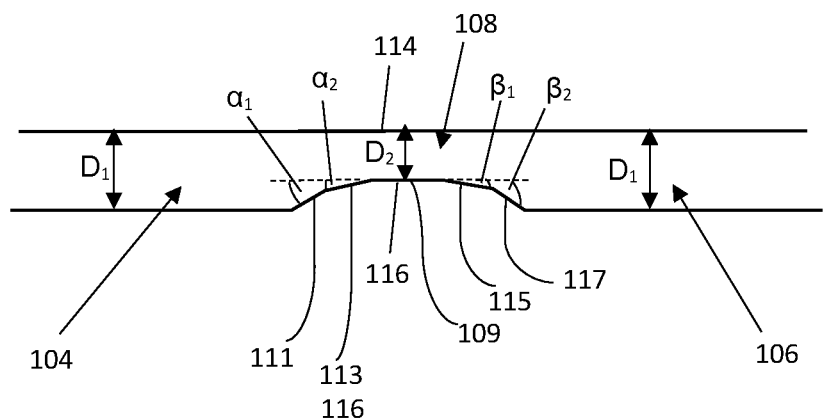

FIGS. 1B and 1C are schematic cross-sectional views of additional examples of the sloping segments with a varying slope angle. FIG. 1B shows an embodiment of the flow channel in which the slope angle of the lead sloping segment 110 gradually decreases along the flow path in the direction from the first portion 104 toward the imaging portion 108, namely the downstream direction. The slope angle of the drain sloping segment 112 increases in the downstream direction from the imaging portion 108 toward the second portion 106.

FIG. 1C shows an embodiment of the flow channel in which each of the lead sloping segment 104 and the drain sloping segment 106 has two sub-sloping segments 111, 113 and, 115, 117, respectively. Each of the sub-sloping segments has a different angle with respect to the plane P defined by the planar imaging portion 109, sub-sloping segments 111 and 113 having angles $α_1$, $α_2$, respectively and sub-sloping segments 115 and 117 having angles $β_1$, $β_2$, respectively.

As can be appreciated in FIGS. 1A-1C the thickness of the flow channel varies along the flow path, the first and the second portions 104 and 106 has a relatively wide thickness $D_1$, and the thickness of the imaging portion 108 decreases to a minimum thickness of $D_2$ in the planar imaging portion 109. The relatively low thickness $D_2$ of the flow channel 102 at the planar imaging portion 109 sets suitable conditions for imaging flowing liquid in the channel 102 by an imaging unit disposed at the exterior of the channel 102. To permit such an imaging, at least one of the walls 114 and 116 of the imaging portion 108 is transparent or optically clear, e.g. made of glass.

In case the walls of the imaging portion 108 are entirely transparent, an imaging device can be placed at one side of the imaging portion 108 and a light unit at the other side.

Figure 1D:
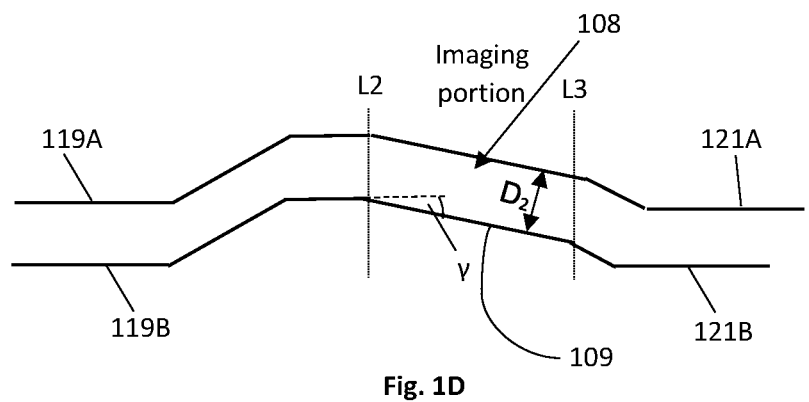

FIG. 1D is a schematic illustration of a cross-sectional view of an example of the flow channel of the present disclosure. In this example, the imaging portion 108, defined between lines L2 and L3, is slanted with respect to the walls 119A, 119B and 121A, 121B of the first and second portions, respectively, in an angle γ. Since the two walls defining the imaging portion parallel to one another, the thickness along the imaging portion $D_2$ remains equal.

In the figures throughout the application, like elements of different figures were given similar reference numerals shifted by the number of hundreds corresponding to the number of the figures. For example, element 202 in FIGS. 2A-2C serves the same function as element 102 in FIGS. 1A-1D.

Figure 2A:
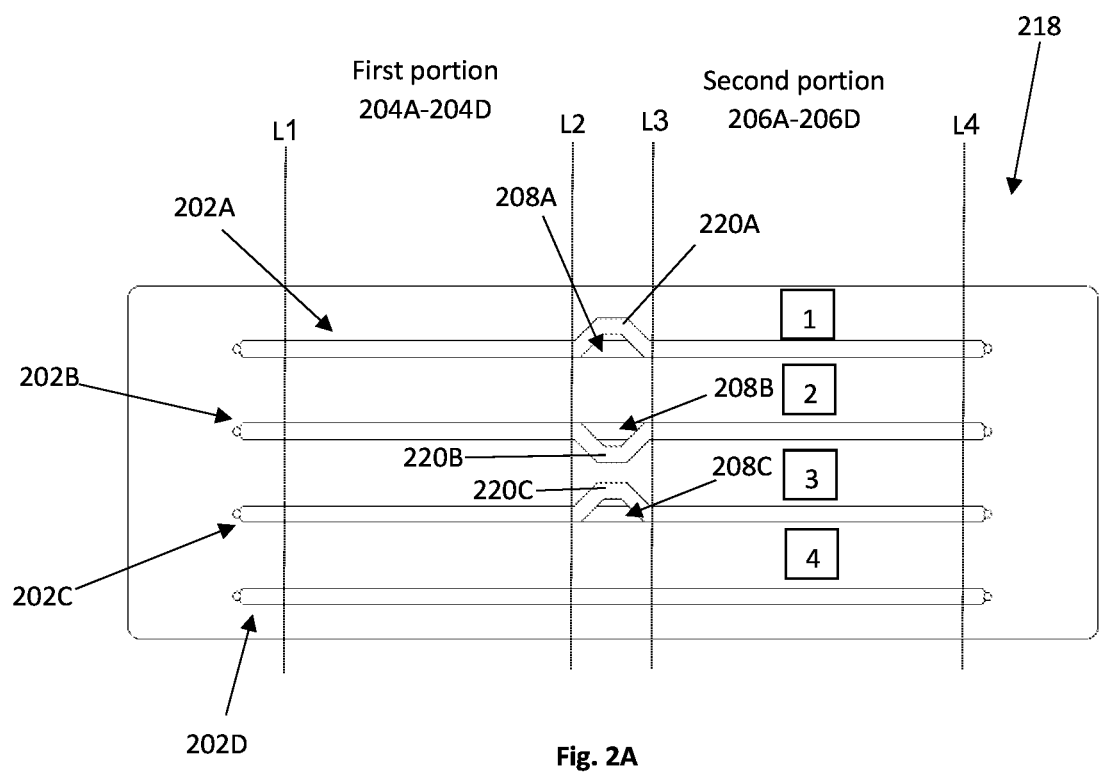
FIGS. 2A-2C are schematic illustrations of a slide having a plurality of flow channels according to an embodiment of the present disclosure.
Figure 2B:
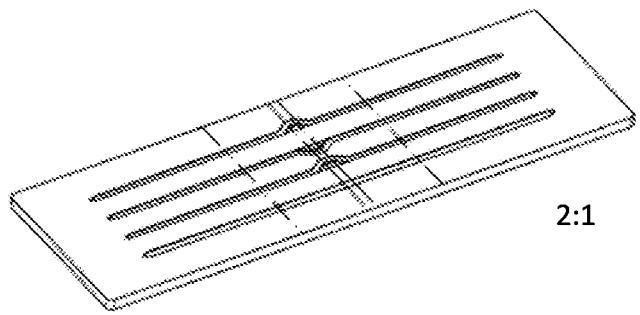
Figure 2C:
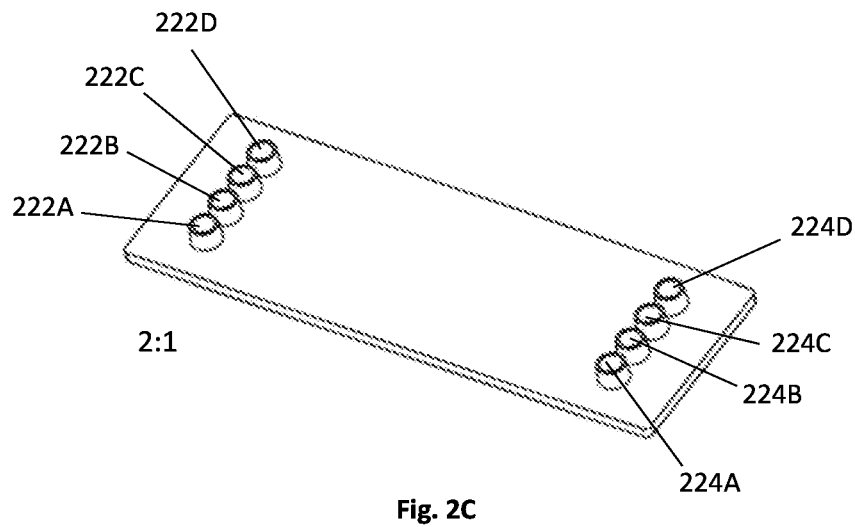

FIGS. 2A-2C show different views of a slide 218 comprising a plurality of flow channels, four in this specific example 202A-202D, numbered 1-4 respectively. As can best be seen in FIG. 2A, which is a schematic illustration of a top view of the slide 218, channels 1-3 202A-202C are configured with a bypass channel 220A-220C linking between the first portion of each channel 1-3 204A-204C and the second portion thereof 206A-206C respectively. The bypass channel 220A-220C permits some of the liquid in the channel to flow therethrough, while the other portion of the liquid flows through the imaging portion 208A-208C respectively. Channel 4 202D has a straight flow path with no bypass channel.

FIGS. 2B and 2C are perspective views of schematic illustrations of top and bottom portions of slide 218, respectively. As can be seen in FIG. 2C each of the channels 1-4 202A-202D is linked to an inlet port 222A-222D and an outlet port 224A-224D. The inlet ports 222A-222D are linked to the first portions 204A-204D, and the outlet ports 224A-224D are linked to the second portions 206A-206D.

As exemplified in FIGS. 2A-2C, the slide may comprise a plurality of channels, each may have a different configuration so as to permit simultaneous imaging of liquid for different types of applications. The channels may all be linked to a single source and perform different types of analysis. In another example, each of the channels may be linked to a different type of liquid source and perform a similar analysis.

Figure 3A:
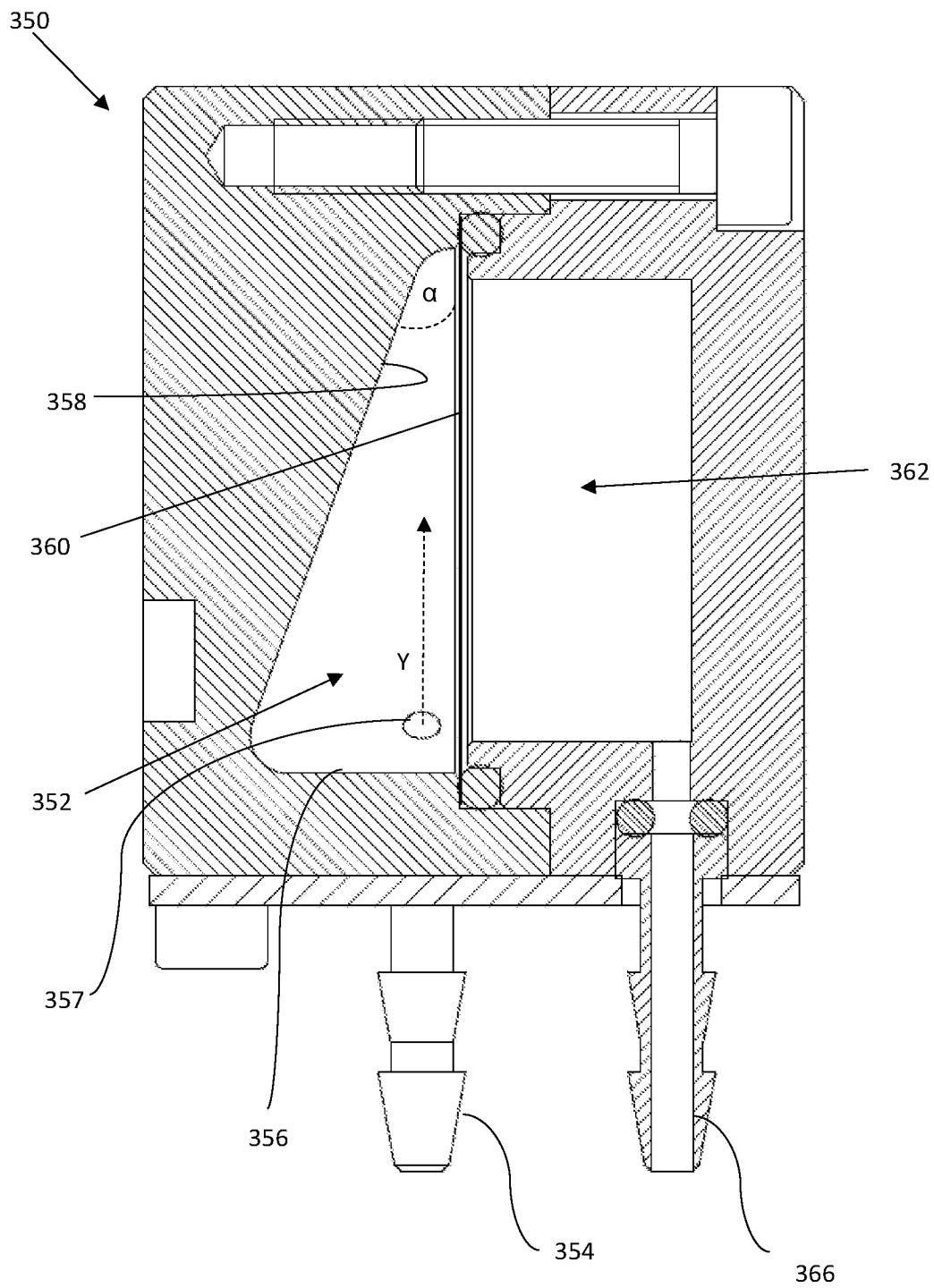
FIGS. 3A-3B are schematic illustrations of a filtration unit according to an embodiment of the present disclosure.

Another aspect of the present disclosure provides a filtration unit for filtering particles from a liquid. FIG. 3A is a longitudinal cross-section of a schematic illustration of an example of a filtration unit according to the present disclosure. Filtration unit 350 has an inlet chamber 352 linked to a source liquid inlet 354 for permitting ingress of liquid to be filtered into the chamber 352 through an opening (not shown). The liquid is configured to ingress the chamber 352 via an opening 357 at the first wall 356, in a general direction as indicated by arrow Y, toward a second wall of the chamber 358. The second wall is inclined with an acute angle α with respect to a plane defined by a planar filter member 360 that separates the inlet chamber 352 and an outlet chamber 362.

Figure 3B:
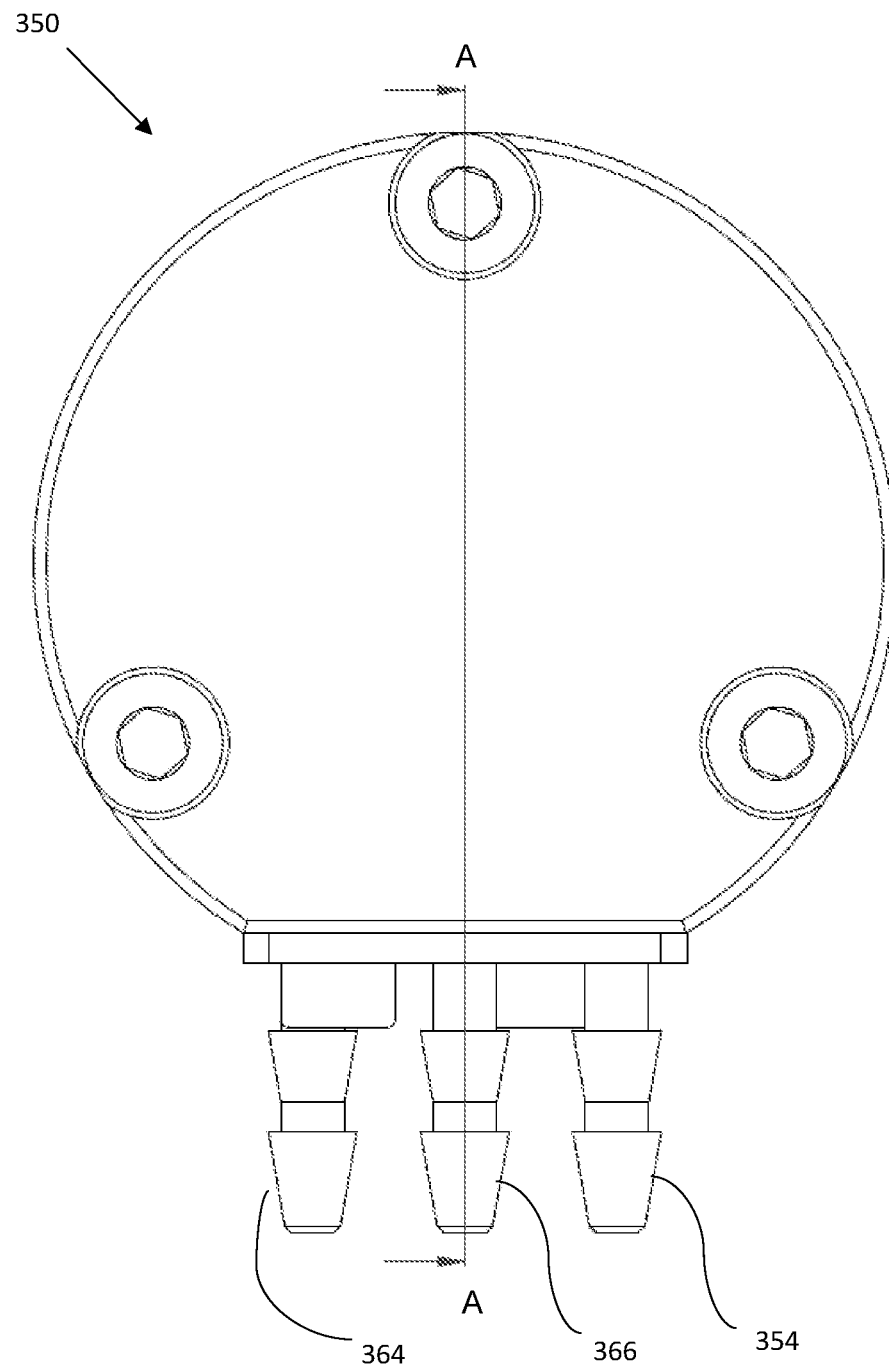

Turning to FIG. 3B, which is a schematic illustration of a side view of an example of the filtration unit of the present disclosure, the inlet chamber 352 is linked with a discharge outlet 364 for discharging liquid and particles that do not pass through the filter member 360, namely blocked thereby.

Filter liquid outlet 366 is linked to outlet chamber 362 for allowing egress of the filtered liquid from the filtration unit for further use, e.g. imaging of the liquid.

Thus, an example of a flow path of liquid through the filtration unit may initiate by egressing through source liquid inlet 354 via an opening 357 at the first wall 356 towards the second wall 358 and being deflected thereby towards the filter member 360. The deflection of the liquid by second wall 358 causes the liquid to flow in a turbulent manner over the surface of filter member 360. A portion of the liquid passes through the filter member 360 and reaches outlet chamber 362 and egress filtration unit 350 via filter liquid outlet 366. The portion of the liquid that is blocked by filter member 360 discharges via discharge outlet 364.

The turbulent flow occurs over the surface of filter member 360 has a dual function: (i) allowing portion of the liquid to pass through filter member 360; and (ii) applying sufficient hydraulic pressure to remove particles that accumulate on the surface of filter member 360, e.g. particles that were blocked thereby, so as to prevent or delay the clogging of the filter member 360.

In the specific example, as shown in FIG. 3A, inlet chamber 354 has a general right-triangular cross-section such that the first wall 356 and filter member 360 are the legs and second wall 358 is the hypotenuse of the right triangle.

The filter member 360 can have a general round shape and accordingly the front of the filtration unit 350 has a round shape as can be appreciated in FIG. 3B.

Filtered liquid egressing via filter liquid outlet 366 may flow downstream to a flow channel to undergo imaging and monitoring therein. For example, the liquid can flow to any of the exemplified channels in FIGS. 1-2. The liquid flows along the flow path of the channel, at least a portion thereof flows through the imaging portion and being imaged while passing therethrough by an imaging unit. The imaging portion is typically characterized by a laminar flow to permit a repetitive and accurate analysis of the liquid (e.g. identifying contaminating particles, microorganism, etc.).

Figure 4:
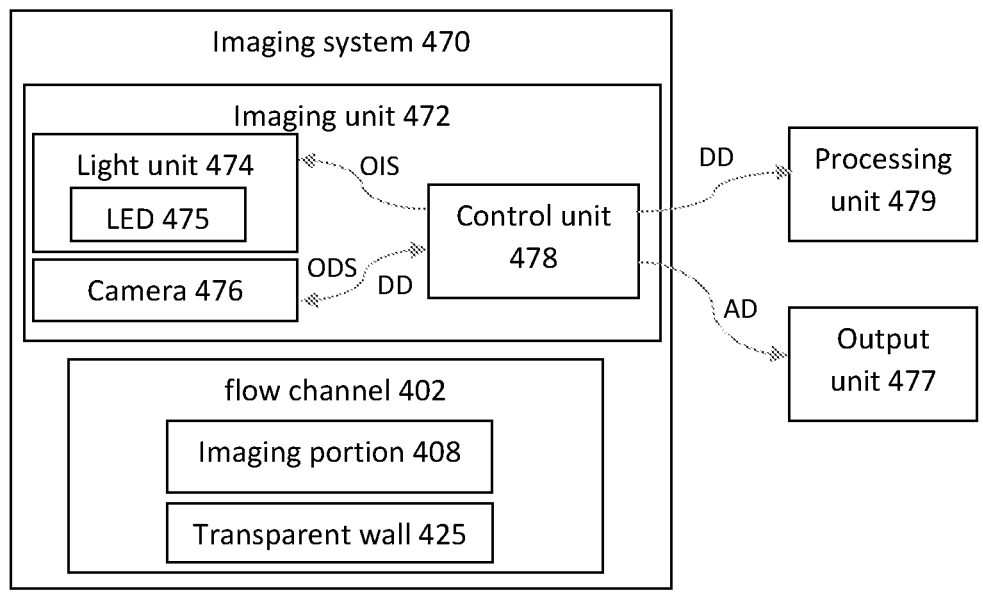
FIG. 4 is a block diagram of an imaging system according to an embodiment of the present disclosure.

FIG. 4 is a block diagram of an imaging system according to an aspect of the present disclosure. In this specific example, the imaging portion 408 is comprised within a flow channel 402 and may be included as an integral part of the imaging system 470. However, the imaging system 470 can be independent of the flow channel and the imaging portion 408. In other words, the imaging portion 408 may be a component that is not included or integrated into the imaging system 470. The flow channel is formed with at least one transparent wall 425 to permit imaging of the fluid flows therein. The imaging is performed by an imaging unit 472 that includes a light unit 474, having at least one LED source 475, to illuminate the fluid at the imaging portion 408, and an image sensor such as a camera 476 to sense illumination response of the light illuminating the fluid by the light unit 474. In other words, image sensor 476 senses the transmission of the light through the fluid and/or the reflection of the incident light from the fluid.

A control unit 478 is configured to synchronize between the light unit 474 and camera 476 such that the detection of illumination response is carried out when illumination is performed by the light unit 474. Thus, the control unit 478 sends operational illuminating signals OIS to operate the light unit 474 at predetermined time slots and operational detecting signals ODS to operate the camera 476 in synchronization with the light unit 474. The time slots of the illumination are typically less than 100 μsec, and at times the duration of the time slots may be less than 20 μsec or about 8-12 μsec. The operational illuminating signals OIS may include operational data for operating the LED 475 with a relatively high current, for example between about 8-12

Ampere. Thus, the illumination periods are characterized by a relatively short and high-intensity illumination.

The camera 476 generates detection data DD and sends it to the control unit 478 for further processing. The control unit analyzes the detection data DD and generates analyzed data AD of the monitored fluid. The analyzed data AD may be transmitted to an output unit 477 such as a monitor, remote computing unit, mobile phone, cloud, etc. In some embodiments, the raw detection data DD may be transmitted to be processed at a remote location by a processing unit 479.

Figure 5:
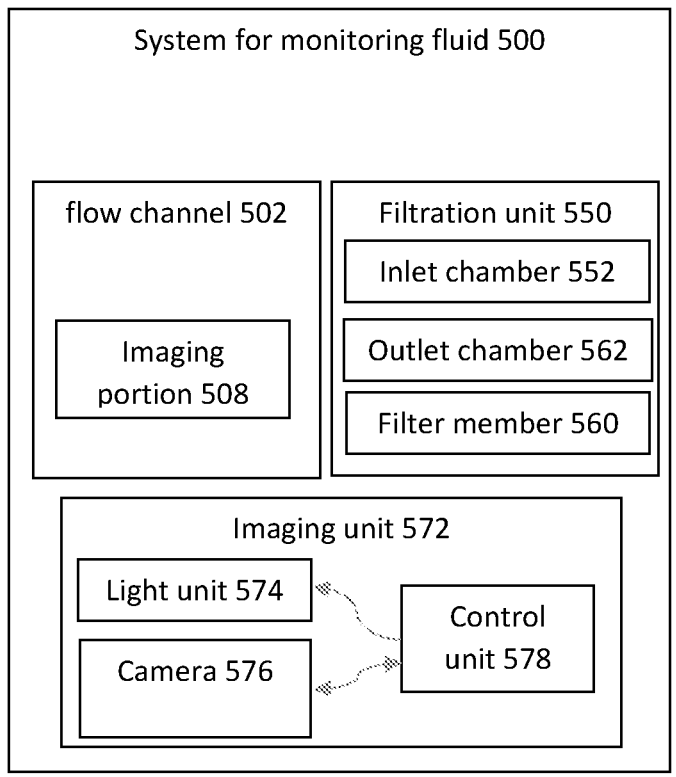
FIG. 5 is a block diagram of a system for monitoring liquid according to an embodiment of the present disclosure.

FIG. 5 is a block diagram of a system for monitoring liquid according to an aspect of the present disclosure. The system 500 has filtration unit 550 having (i) an inlet chamber 552 to receive fresh liquid to be filtered; (ii) a filter member 560 to filter particles and/or microorganism above a predetermined size from the liquid; and (iii) an outlet chamber 562 to receive the filtered liquid. The filtered liquid flows downstream from the outlet chamber 562 of the filtration unit 550 to be received in a flow channel 502. The channel 502 has an imaging portion 508 for imaging at least a portion of the liquid by an imaging unit 572. The imaging unit 572 includes a light unit 574 to illuminate the liquid that flows through the imaging portion 508, and a camera 576 to detect illumination response of the illumination of the light unit 574 at the liquid on the imaging portion 508. Control unit 578 is configured to synchronize the operation of the light unit 574 and camera 576 and to receive detection data from camera 576.

The invention claimed is:

1. A device comprising:
a flow channel comprising a first portion, an imaging portion downstream thereto and a second portion downstream said imaging portion, such that a liquid flowing through said flow channel flows from said first portion through said imaging portion and from said imaging portion to exit said flow channel through said second portion;
wherein a first side of said first portion is linked by a lead sloping segment to said imaging portion at a first slope angle and a first side of said second portion is linked by a drain sloping segment to said imaging portion at a second slope angle, and second sides of said first and second portions opposite to said first sides of said first and second portions are not sloped with respect to said imaging portion;
wherein said imaging portion is dimensioned with respect to flow of a liquid therethrough such that the flow of the liquid therethrough is laminar; and
an imaging unit positioned in view of said imaging portion to capture images of the liquid flowing therethrough.

2. The device according to claim 1, further comprising a filtration unit upstream of said flow channel, said filtration unit comprising a filter in which said liquid is directed to flow in a turbulent manner over a surface of said filter.

3. The device according to claim 2, wherein said filtration unit comprises a liquid inlet for directing the liquid via an opening at a first wall towards a second wall so the liquid is deflected thereby towards said filter in the turbulent manner over the surface of said filter.

4. The device according to claim 2, wherein a portion of the liquid passes through said filter to an outlet chamber and egresses said filtration unit via a filter liquid outlet.

5. The device according to claim 2, wherein a portion of the liquid that is blocked by said filter discharges via a discharge outlet.

6. The device according to claim 1, wherein one or both of said first and second slope angles is constant.

7. The device according to claim 1, wherein one or both of said first and second slope angles is gradually increasing or gradually decreasing.

8. The device according to claim 1, wherein said first and second slope angles are identical.

9. The device according to claim 1, wherein said first and second slope angles are different from each other.

10. The device according to claim 1, wherein said imaging unit comprises a light unit configured to illuminate said imaging portion and an image sensor configured to detect illumination response from said imaging portion to obtain imaging data, and the device further comprises a control unit in communication with said light unit and said image sensor, the control unit being configured to synchronize between said light unit and said image sensor such that detection of the illumination response is carried out when illumination is performed by said light unit during an illumination time period.

11. The device according to claim 10, wherein the illumination time period is in a range of 0.1 to 20 μsec.

12. The device according to claim 10, wherein said light unit is activated by a current at least 5-fold its current rating.

13. A device comprising:
a flow channel comprising a first portion, an imaging portion downstream thereto and a second portion downstream said imaging portion;
wherein said imaging portion is dimensioned with respect to flow of a liquid therethrough such that the flow of the liquid therethrough is laminar;
an imaging unit positioned in view of said imaging portion to capture images of the liquid flowing therethrough; and
a bypass channel linking between said first portion and said second portion, wherein a lead sloping segment diverts flow from said first portion at a first slope angle to said bypass channel and a drain sloping segment diverts flow from said bypass channel at a second slope angle to said second portion, such that a portion of the liquid flows through said bypass channel and another portion of the liquid flows through said imaging portion.

14. The device according to claim 13, wherein one or both of said first and second slope angles is constant.

15. The device according to claim 13, wherein one or both of said first and second slope angles is gradually increasing or gradually decreasing.

16. The device according to claim 13, wherein said first and second slope angles are identical.

17. The device according to claim 13, wherein said first and second slope angles are different from each other.

18. The device according to claim 13, wherein said imaging unit comprises a light unit configured to illuminate said imaging portion and an image sensor configured to detect illumination response from said imaging portion to obtain imaging data, and the device further comprises a control unit in communication with said light unit and said image sensor, the control unit being configured to synchronize between said light unit and said image sensor such that detection of the illumination response is carried out when illumination is performed by said light unit during an illumination time period.

19. The device according to claim 18, wherein the illumination time period is in a range of 0.1 to 20 μsec.

20. The device according to claim 18, wherein said light unit is activated by a current at least 5-fold its current rating.

\* \* \* \* \*